Figure 1:
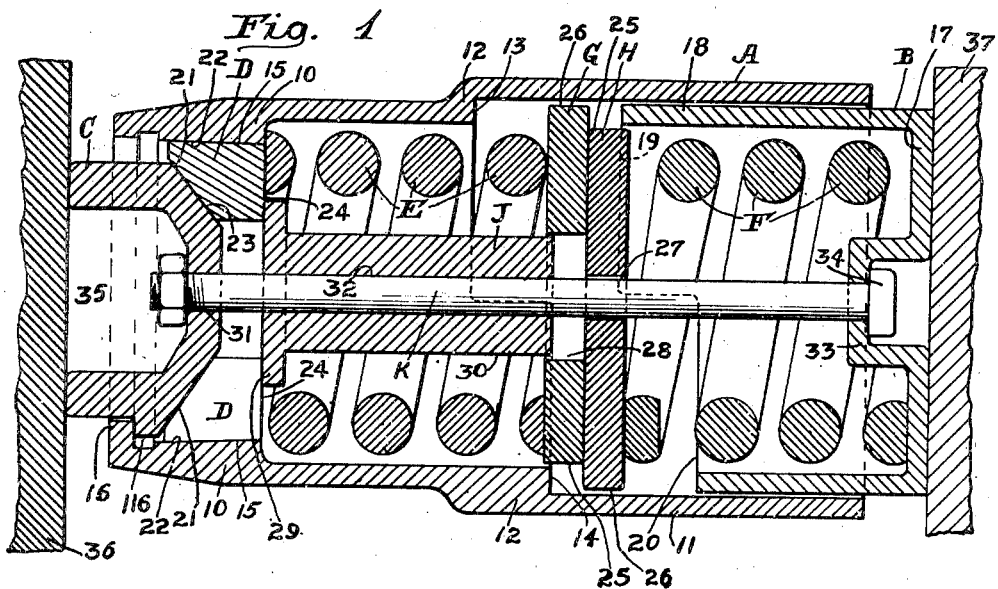

Jan. 4, 1949.   G. E. DATH   2,457,979
FRICTION SHOCK ABSORBING MECHANISM
FOR RAILWAY DRAFT APPLIANCES
Filed Sept. 30, 1946   3 Sheets-Sheet 1

Inventor:
George E. Dath.
By Henry Fuchs.
Atty.

Jan. 4, 1949. G. E. DATH 2,457,979
FRICTION SHOCK ABSORBING MECHANISM
FOR RAILWAY DRAFT APPLIANCES
Filed Sept. 30, 1946 3 Sheets-Sheet 2
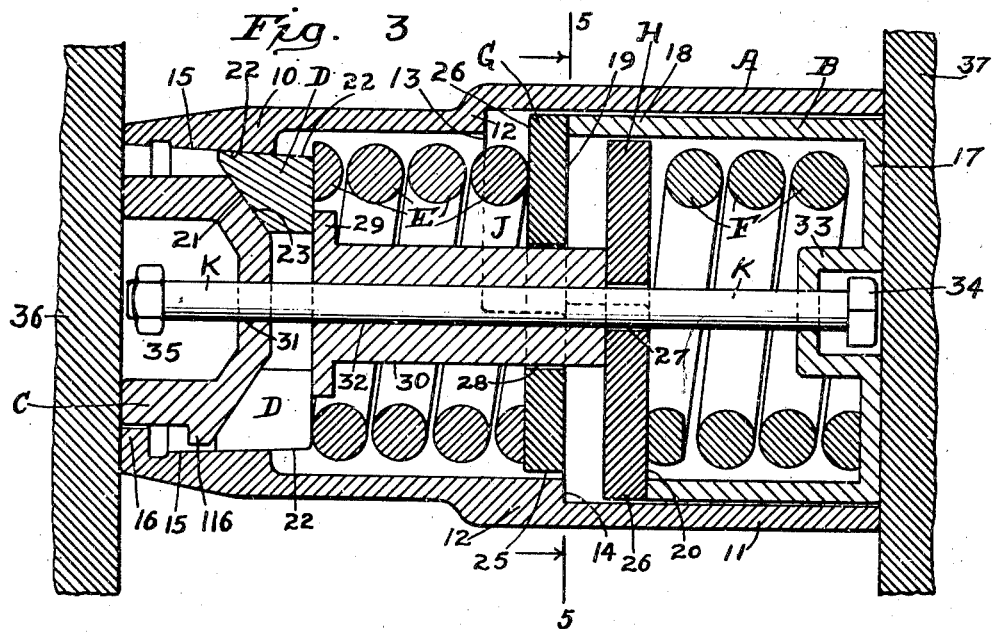
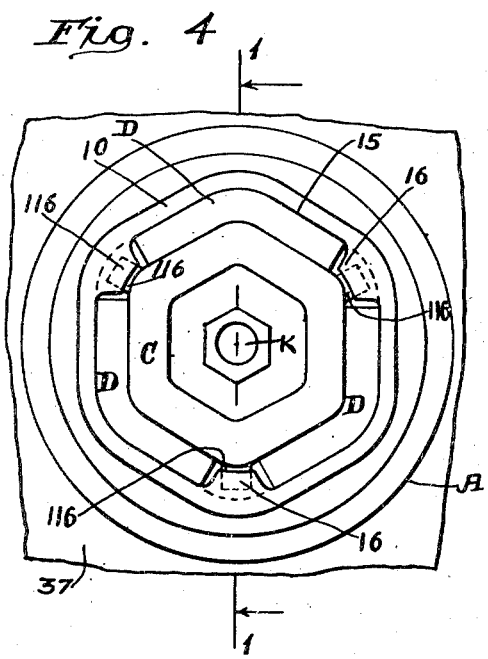
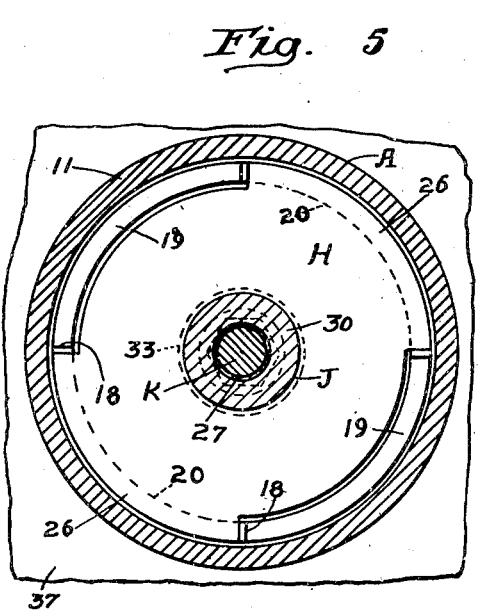
Inventor:
George E. Dath.
By Henry Fuchs.
Atty.

Inventor:
George E. Dath.
By Henry Fuchs.
Atty

Patented Jan. 4, 1949

2,457,979

UNITED STATES PATENT OFFICE 2,457,979

FRICTION SHOCK ABSORBING MECHANISM FOR RAILWAY DRAFT APPLIANCES

George E. Dath, Mokena, Ill., assignor to W. H. Miner, Inc., Chicago, Ill., a corporation of Delaware Application September 30, 1946, Serial No. 700,317

5 Claims. (Cl. 213—34)

This invention relates to improvements in friction shock absorbing mechanisms for railway draft appliances.

One object of the invention is to provide a friction shock absorbing mechanism especially adapted for draft riggings of railway cars having preliminary spring action during the first part of the compression stroke to absorb the lighter shocks to which the mechanism is subjected in service and combined spring and frictional resistance during the remander of the compression stroke to absorb the heavier shocks, wherein the light preliminary action is produced by spring members compressed in series, and the high combined spring and frictional resistance is produced by relatively movable friction elements having their movement resisted by said spring members being compressed in tandem.

A more specific object of the invention is to provide a mechanism of the character indicated, comprising a friction casing, a follower casing slidingly telescoped within the rear end of the friction casings, a friction clutch slidingly telescoped within the front end of the friction casing, front and rear spring members within said friction casing, front and rear follower plates interposed between the spring members for transmitting the force from one to the other, and a pressure transmitting column member or plunger for transmitting the actuating force from the friction clutch to the rear follower plate, wherein the spring members are compressed in series between the follower casing and friction clutch by relative movement of the friction casing and follower casing toward each other during the first part of the compression stroke to provide the preliminary light action, and wherein, after a predetermined compression of the mechanism, relative movement of the friction and follower casings is arrested to compel relative movement of the friction clutch and friction casing, and the follower casing and pressure transmitting column member or plunger are brought into operative engagement with the front and rear follower plates, respectively, to effect compression of said spring members in tandem in resisting relative movement of the clutch and friction casing to provide the high shock absorbing capacity.

Other objects of the invention will more clearly appear from the description and claims hereinafter following.

Figure 2:
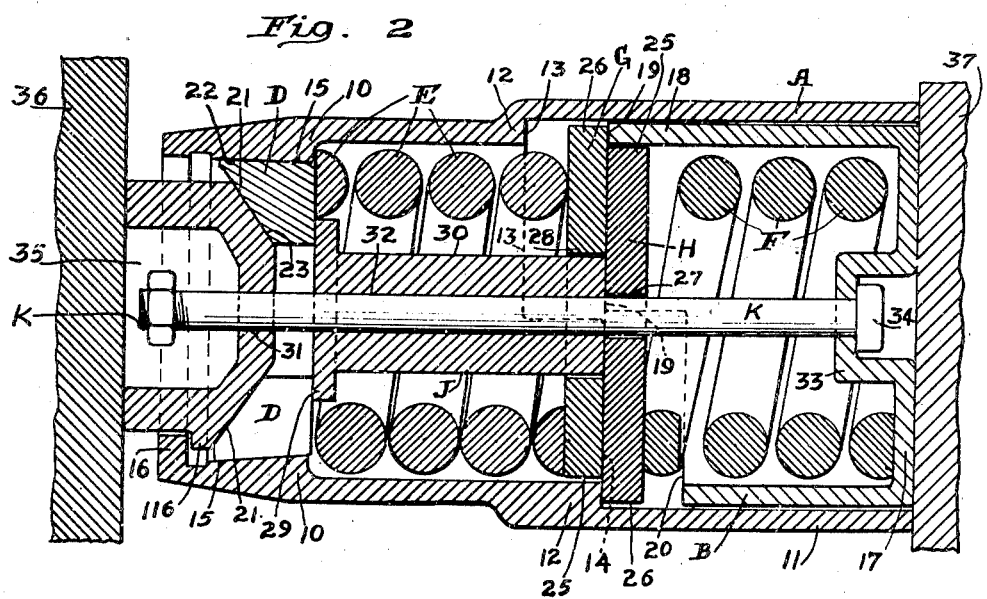
Figure 6:
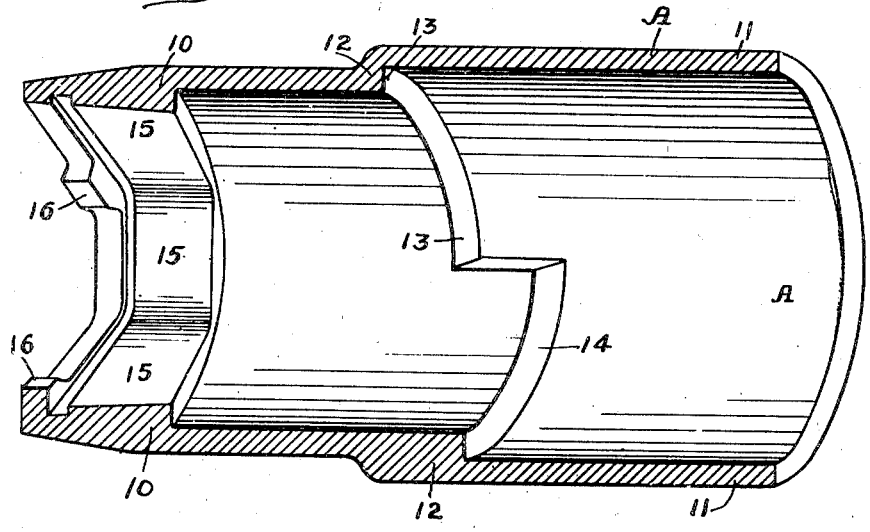
Figure 7:
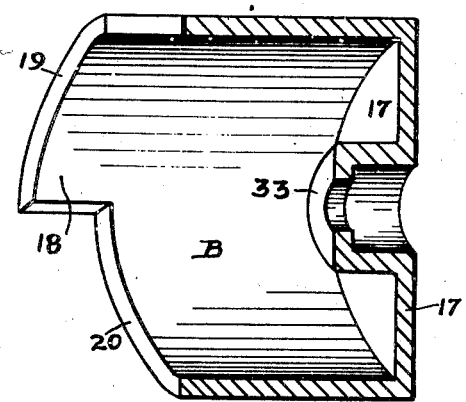
Figure 8:
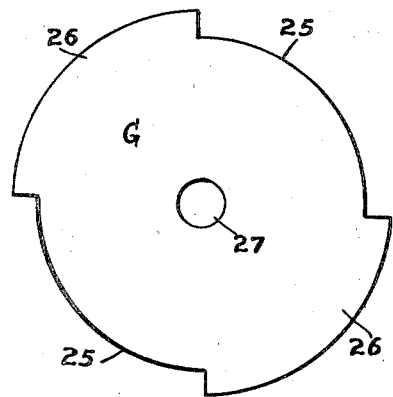
Figure 9:
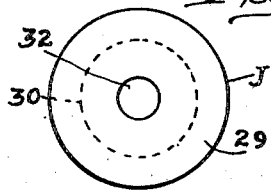

In the accompanying drawings forming a part of this specification, Figure 1 is a longitudinal, vertical sectional view of my improved friction shock absorbing mechanism, said view corresponding substantially to the line 1—1 of Figure 4. Figure 2 is a view, similar to Figure 1, showing the mechanism partly compressed. Figure 3 is a view similar to Figure 1, showing the mechanism fully compressed. Figure 4 is a front elevational view of the improved mechanism. Figure 5 is a transverse, vertical sectional view, corresponding substantially to the line 5—5 of Figure 3. Figure 6 is a detail perspective view in longitudinal section of the friction casing of my improved mechanism, looking toward the front end of said casing. Figure 7 is a detail perspective view in longitudinal section of the follower casing of my improved mechanism, looking toward the rear end of said casing. Figure 8 is an elevational view of the front follower plate looking toward the right in Figure 1. Figure 9 is a front view of the pressure transmitting column member or plunger of my improved mechanism.

As shown in the drawings, my improved friction shock absorbing mechanism comprises broadly a friction casing A; a follower casing B; a wedge block C; three friction shoes D—D—D; front and rear springs E and F; a follower plate G bearing on the rear end of the spring E; a follower plate H bearing on the front end of the spring F; a pressure transmitting post or plunger J interposed between the friction shoes and the follower plate H; and a retainer bolt K for holding the mechanism assembled.

The casing A is in the form of a hollow tubular member open at its front and rear ends. At the front end, the walls of the casing are inwardly thickened to provide a friction shell section 10. The section 10 is of substantially hexagonal, interior and exterior cross section. Rearwardly of the friction shell section, the casing is in the form of a cylinder, and the rear end portion of said cylinder is expanded or diametrically enlarged, as indicated at 11. The enlarged portion 11 has the walls thereof inwardly thickened at its forward end, as indicated at 12, and said thickened wall portion is provided with circumferentially arranged, interior shoulders 13—13 and 14—14, the shoulders 13—13 being alternated with the shoulders 14—14, and the shoulders 14—14 being offset rearwardly with respect to the shoulders 13—13, as clearly shown in Figure 6. Each shoulder 13 and 14 extends through an arc of approximately 90 degrees and the shoulders of each set 13—13 and 14—14 are at diametrically opposite sides of the mechanism. The hexagonal front end section 10 of the casing presents three inwardly converging, interior friction surfaces 15—15—15 of V-shaped, transverse cross section, each V-shaped surface 15 being formed by two adjacent wall members of the hexagonal friction shell section. Forwardly of the friction surfaces thereof, the casing has three inturned stop lugs 16—16—16, which are spaced equally apart, circumferentially of the casing, and serve to limit outward movement of the wedge block C, which block is provided with three radially projecting lugs 116—116—116 engaging in back of the stop lugs of the casing.

The follower casing B is in the form of a cylindrical cap open at its front end and closed at its rear end by a transverse wall 17. At the forward end of the casing B, the side wall thereof is cut away at diametrically opposite sides to provide a pair of forwardly projecting, diametrically opposed arms 18—18. The forward end of the casing B thus presents forwardly facing shoulders 19—19 at the outer ends of the arms 18—18 and shoulders 20—20 rearwardly offset with respect to the shoulders 19—19. Each shoulder 19 and 20 extends through an arc of approximately 90 degrees and the shoulders of each pair 19—19 and 20—20 are disposed at diametrically opposite sides of the mechanism.

The follower casing B is slidingly telescoped within the enlarged end portion 11 of the casing A with the shoulders 19—19 at the outer ends of the arms 18—18 in longitudinal alignment with the shoulders 13—13 of the casing A and the shoulders 20—20 in alignment with the shoulders 14—14.

The wedge block C is arranged centrally of the open front end of the casing A and has three inwardly converging wedge faces 21—21—21 at the inner end which cooperate with the shoes D—D—D. Each wedge face 21 is preferably of V-shaped, transverse section. The lugs 116—116—116 of the wedge C are alternated with the wedge faces thereof, each lug extending between adjacent shoes and engaging in back of the corresponding stop lug 16 of the casing A.

The friction shoes D, which are three in number, are arranged around the wedge block C, being interposed between the wedge faces 21—21—21 of the block and the friction surfaces 15—15—15 of the casing A. Each shoe D has a lengthwise extending friction surface 22 on the outer side, which is of V-shaped, transverse section and engages one of the V-shaped surfaces 15 of the casing, and a wedge face 23 on its inner side, which is of V-shaped, transverse section and correspondingly inclined to, and engaging with, one of the V-shaped wedge faces 21 of the block C. The rear end of each shoe D presents a transversely extending, flat abutment face 24 for the spring E and the post or plunger J.

The springs E and F are arranged within the casing A, each spring being in the form of a heavy helical coil. The follower plates G and H are interposed between the springs E and F, each plate being in the form of a relatively heavy, substantially circular member, cut away at diametrically opposite sides, as indicated at 25—25, thus providing radially outwardly extending, arc-shaped wings 26—26 at diametrically opposite sides thereof. The follower plate H has a central opening 27 extending therethrough to accommodate the shank of the retainer bolt K. The plate G also has a central opening 28 therethrough, which is of larger diameter than the opening 27 of the plate H, the same being of such a size as to loosely accommodate the inner end portion of the post or plunger J for lengthwise movement therethrough.

The follower plate G bears on the rear end of the spring E and has the wings 26—26 thereof disposed in longitudinal alignment with the shoulders 13—13 of the casing A and the arms 18—18 of the casing B, and the follower plate H bears on the front end of the spring F and has the wings 26—26 thereof in longitudinal alignment with the shoulders 14—14 of the casing A and the shoulders 20—20 of the casing B. In the normal full release position of the mechanism, as shown in Figure 1, the plates G and H are in contact with each other and float between the shoulders of the casings A and B, the wings 26—26 of the follower plate G being spaced a predetermined distance forwardly from the shoulders 19—19 at the outer ends of the arms 18—18 of the casing B, and the wings 26—26 of the follower plate H being spaced an equal distance rearwardly from the shoulders 14—14 of the casing A. The follower plates are held in contact with each other by the springs E and F, which are under a predetermined amount of initial compression, the springs E being buttressed against the inner ends of the shoes D—D—D at its front end and the spring F being buttressed against the transverse end wall 17 of the casing B at its rear end.

The post or plunger J is in the form of a cylindrical bar having an annular flange or head 29 at its front end bearing on the inner ends of the shoes D—D—D. The cylindrical shank portion of the plunger, which shank portion is indicated by 30, extends through the front spring E and into the opening 28 of the follower plate G. The plunger J is of such a length that, in the normal full release position of the mechanism, it has its rear end spaced forwardly from the follower plate H a distance corresponding to the normal spacing of the follower plate G and the shoulders 14—14 of the casing A. As will be understood, the plunger J is, in effect, a floating member, which, in the normal full release position of the mechanism, may take a position wherein it is spaced from either the follower plate H or the inner ends of the shoes or a position spaced from both the follower plate H and the shoes, the position shown in Figure 1 being merely illustrative of one of such positions.

The retainer bolt K, which holds the mechanism assembled and of uniform overall length, extends through an opening 31 in the wedge block C, a central bore 32 in the post or plunger J, openings 28 and 27 in the follower plates G and H, through the coil spring F, and into a central, hollow boss 33 on the wall 17 of the casing B, having its head 34, which is at the rear end thereof, anchored within the boss 33, and the nut thereof, which is at its forward end, seated in a pocket 35 in the wedge block C.

My improved friction shock absorbing mechanism is interposed between the usual front and rear follower members of the railway draft rigging, which follower members are indicated, respectively, by 36 and 37 in Figures 1, 2, 3, 4, and 5 of the drawings.

In the normal full release position of the mechanism, as shown in Figure 1, the retainer bolt K maintains the parts so positioned that the wedge C and the follower casing B project from opposite ends of the casing A in abutting relation with the front and rear followers 36 and 37 of the draft rigging. In this position of the parts, the follower plates G and H are spaced from the corresponding shoulders of the casings B and A, and the plunger J floats between the shoes D—D—D and the follower plate H. The projection of the rear end of the casing B beyond the rear end of the casing A corresponds to the total spacing of the follower plates G and H from the corresponding shoulders 19—19 of the casing B and 14—14 of the casing A. In other words, assuming that the mechanism has a total compression of 2½ inches, and the normal projection of the casing B, beyond the rear end of the casing A, is 1½ inches, and the projection of the wedge block C is 1 inch beyond the front end of the casing A, the follower plates G and H are arranged so that each of the same is spaced ¾ inch from the cooperating shoulders of the corresponding casing, and the lost motion between the plunger J and the shoes D—D—D and follower plate H is made such that ¾ inch will be taken up before motion is transmitted by the plunger J from the shoes D—D—D to the follower plate H.

The operation of my improved friction shock absorbing mechanism is as follows: Upon relative movement of the end followers 36 and 37 of the draft rigging toward each other, the mechanism is compressed therebetween, forcing the follower casing B inwardly of the friction casing A, thereby compressing the springs E and F in series against the friction shoes, the latter remaining stationary during this action, due to the static friction between the shoes and the casing A. Relatively light preliminary spring action is thus provided during the first part of the compression stroke. As the compression of the mechanism progresses, the parts move to the position shown in Figure 2. During this movement of the parts, the follower plates G and H transmit the pressure from one spring directly to the other, the outer ends of the arms 18—18 of the casing B approach the wings 26—26 of the follower plate G, the shoulders 14—14 of the casing A approach the wings 26—26 of the follower plate H, and the rear end of the casing A approaches the rear follower 37 of the draft rigging while the slack between the post or plunger J and the shoes D—D—D and follower H is taken up. When the mechanism has been compressed to the extent shown in Figure 2, the inner end of the casing A has been brought into engagement with the rear follower 37 and the lost motion between the arms 18—18 of the casing B and the follower plate G has been fully taken up, as well as the lost motion between the plunger J and the shoes D—D—D and the follower plate H. Thus, during the further compression of the mechanism to the fully closed position shown in Figure 3, the wedge and friction shoes are forced inwardly of the casing A, resisted by the springs E and F acting in tandem. During this last named action of the mechanism, assuming that the front follower 36 of the draft rigging is being moved rearwardly toward the rear follower 37, the friction clutch comprising the wedge C and the shoes D—D—D is forced rearwardly of the casing A, the latter being held stationary by the rear follower 37, which it abuts. As the shoes move inwardly of the casing A, along the friction surfaces thereof, the plunger J moves rearwardly with the shoes, forcing the follower plate H rearwardly and compressing the spring F against the rear wall of the casing B, which is held against movement by the rear follower 37 of the draft rigging. At the same time, the front spring E is compressed between the shoes and the follower plate G, which at this time is held stationary by the engaging arms 18—18 of the casing B, which is buttressed against the rear follower 37 of the draft rigging.

When the mechanism has been fully compressed, as shown in Figure 3, the actuating force is transmitted from one main follower to the other by the casing A, which acts as a column load sustaining member, preventing over compression of the springs of the device, thereby protecting the springs against damage.

When the actuating force is reduced, the expansive action of the springs E and F restores all of the parts to the normal full release position shown in Figure 1, outward or forward movement of the wedge C being limited by the lugs 116—116—116 thereof, shouldering against the stop lugs 16—16—16 of the casing A, and rearward outward movement of the casing B, with respect to the casing A, being limited by the retainer bolt K.

I claim:

1. In a friction shock absorbing mechanism, the combination with a friction casing; of a friction clutch slidingly telescoped within the front end of the casing; a spring follower member slidingly telescoped within the rear end of the casing, said follower being movable inwardly of the casing to a predetermined extent less than the full compression stroke of the mechanism; front and rear springs within the casing yieldingly opposing relative movement of said clutch and spring follower member toward each other; a follower plate engaging the rear end of said front spring; a second follower plate engaging the front end of said rear spring, said follower plates being normally in engagement with each other to transmit the force from one spring to the other to effect compression thereof in series during movement of said spring follower member inwardly of the casing to said prdetermined extent; stop means on said spring follower member engaged by said first named follower plate after said spring follower member has been moved inwardly of the casing to said predetermined extent to arrest relative movement of said first named follower plate and spring follower member, said front spring being compressed between the clutch and the first named follower plate upon inward movement of the clutch with respect to the friction casing; and pressure transmitting means movable inwardly of the friction casing with said clutch and engageable with said second named follower plate after said spring follower member has been moved inwardly of the casing to said predetermined extent to move said second named follower plate toward said spring follower member to compress said rear spring in tandem with said front spring.

2. In a friction shock absorbing mechanism, the combination with a casing open at its front and rear ends, said casing having a friction shell section at the front end thereof; of a spring follower member slidingly telescoped within the rear end of said casing, said spring follower member being movable inwardly of the casing to a predetermined extent less than the full compression stroke of the mechanism; front and rear springs within the casing yieldingly opposing movement of said spring follower member inwardly of the casing to absorb relatively light shocks; a friction clutch slidingly telescoped within the friction shell section of the casing, said clutch being buttressed against said front spring; a pair of follower plates interposed between said springs, one of said plates bearing on the rear end of the front spring and the other of said plates bearing on the front end of said rear spring; and pressure transmitting means actuated respectively by said clutch and spring follower, said pressure transmitting means being normally spaced from said follower plates and engageable with the latter after the mechanism has been compressed to said predetermined extent to compress said springs in tandem.

3. In a friction shock absorbing mechanism, the combination with a friction casing; of a spring follower slidingly telescoped within one end of the casing; a friction clutch slidingly telescoped within the other end of the casing; front and rear springs within the casing reacting between said clutch and spring follower and compressible in series between the same to yieldingly oppose inward movement of the spring follower during the first part of the compression stroke of the mechanism; an intermediate follower between said springs; and means for compressing said springs in tandem during the last part of the compression stroke, comprising stop means on said spring follower engaged by said intermediate follower for arresting rearward movement thereof, and a member actuated by inward movement of said friction clutch for compressing said rear spring against said spring follower.

4. In a friction shock absorbing mechanism, the combination with a friction casing; of front and rear springs within the casing; a spring follower plate bearing on the rear end of said front spring; a second spring follower plate bearing on the front end of said rear spring; a friction clutch slidingly telescoped within the front end of the casing and bearing on the front end of said front spring; a follower cap slidingly telescoped within the rear end of the casing and bearing on the rear end of said rear spring; a forwardly projecting arm on said cap normally spaced from said first named follower plate; and a pressure transmitting plunger engaged by said clutch and normally spaced from said second named follower plate, said arm and plunger being engageable with said first and second named plates, respectively, after the mechanism has been compressed to a predetermined extent to compress said front and rear springs in tandem.

5. In a friction shock absorbing mechanism for railway draft riggings having front and rear follower members, the combination with a friction casing; of friction shoes slidingly telescoped within the front end of the casing; a wedge block having wedging engagement with said shoes and bearing at its front end on said front follower; a spring follower member slidingly telescoped within the rear end of the casing and bearing at its outer end on said rear follower, said spring follower member being movable inwardly of the casing to a predetermined extent, inward movement of said spring follower member being limited by engagement of said rear follower with the rear end of the casing; front and rear springs within the casing yieldingly opposing relative movement of said shoes and spring follower member toward each other; a follower plate engaging the rear end of said front spring; a second follower plate engaging the front end of said rear spring, said follower plates being normally in engagement with each other to transmit the force from one spring to the other to effect compression thereof in series during movement of said spring follower member inwardly of the casing; stop means on said spring follower member engageable with said first named follower plate upon engagement of said rear follower with the casing; and pressure transmitting means movable rearwardly of the friction casing with said friction shoes and engageable with said second named follower plate after the rear follower engages the friction casing, said front and rear springs being compressed in tandem against said first named follower plate and spring follower member by rearward movement of the friction shoes and pressure transmitting means after the rear follower comes into engagement with the friction casing.

GEORGE E. DATH.

No references cited.